United States Patent
Finlayson

(10) Patent No.: US 7,053,778 B2
(45) Date of Patent: May 30, 2006

(54) LIVESTOCK PROCESSING ANTENNA

(75) Inventor: John Douglas Frank Finlayson, Brendale (AU)

(73) Assignee: Aleis Trakit Pty Ltd, Jandowae (AU)

(*) Notice: Subject to any disclaimer, the term of this patent is extended or adjusted under 35 U.S.C. 154(b) by 23 days.

(21) Appl. No.: 10/477,524

(22) PCT Filed: May 22, 2002

(86) PCT No.: PCT/AU02/00627

§ 371 (c)(1), (2), (4) Date: Feb. 4, 2004

(87) PCT Pub. No.: WO02/097914

PCT Pub. Date: Dec. 5, 2002

(65) Prior Publication Data

US 2004/0263336 A1 Dec. 30, 2004

(30) Foreign Application Priority Data

May 25, 2001 (AU) .......................... pr5248

(51) Int. Cl.
*G08B 13/14* (2006.01)

(52) U.S. Cl. .............................. 340/572.7; 340/572.8; 343/742

(58) Field of Classification Search ............ 340/572.7, 340/572.8; 343/742
See application file for complete search history.

(56) References Cited

U.S. PATENT DOCUMENTS

| | | | |
|---|---|---|---|
| 3,788,276 A * | 1/1974 | Propst et al. ................ | 119/174 |
| 3,948,249 A * | 4/1976 | Ambrosini ................... | 600/551 |
| 4,597,495 A * | 7/1986 | Knosby ....................... | 209/3.3 |
| 4,798,175 A | 1/1989 | Townsend et al. | |
| 5,183,008 A * | 2/1993 | Carrano ....................... | 119/840 |
| 5,221,831 A * | 6/1993 | Geiszler ...................... | 235/440 |
| 5,579,719 A * | 12/1996 | Hoff et al. ................. | 119/51.02 |
| 5,929,760 A * | 7/1999 | Monahan .................. | 340/572.7 |
| 6,166,637 A * | 12/2000 | Cyr et al. .................. | 340/572.7 |
| 6,259,413 B1 * | 7/2001 | Schmidt et al. ............. | 343/742 |
| 6,452,497 B1 * | 9/2002 | Finlayson ................. | 340/572.8 |
| 2004/0070503 A1 * | 4/2004 | Monahan .................. | 340/572.7 |

FOREIGN PATENT DOCUMENTS

| | | |
|---|---|---|
| AU | 77306/91 | 11/1991 |
| DE | 19942217 | 3/2001 |
| EP | 0962407 | 12/1999 |
| WO | WO 98/31215 | 7/1998 |

OTHER PUBLICATIONS

International Preliminary Examination Report for PCT/AU02/00627 citing 5 documents; Jul. 5, 2002.

* cited by examiner

*Primary Examiner*—Daniel Wu
*Assistant Examiner*—Son Tang
(74) *Attorney, Agent, or Firm*—Shoemaker and Mattare

(57) ABSTRACT

An antenna system for use in processing of livestock carcasses including in combination, antenna means adapted to transmit and receive signals from transponders in or on carcasses moving on a conveyer system, support means adapted to support the antenna, pivoting means adapted to enable the antenna to pivot on the support means as each carcass comes into contact with the antenna, wherein in operation, the pivoting action enables a wiping contact to be maintained between the antenna and a carcass sufficient to obtain a positive reading of the transponder irrespective of a rotational and/or angular displacement of the carcass about a vertical axis without causing dislodgement of the carcass from the conveyer system or bruising of the carcass.

10 Claims, 2 Drawing Sheets

LIVESTOCK PROCESSING ANTENNA

FIELD OF THE INVENTION

This invention relates to the livestock food processing industry in particular but not limited to an antenna system for reading transponder tags in or on animal or bird carcasses.

BACKGROUND OF THE INVENTION

The use of transponders to electronically tag animals and birds is well known. Examples of such tags devices are given in Patent Nos. Tags—WO 97/46083 and WO 93/22907 and Rumen Pellet PCT/AU95/00218. The devices take the form of rumen pellets which are ingested to remain in the rumen and/or ear tags which are fastened to the ears or bodies of animals or birds. The devices are designed to enable operators to track livestock from pasture to abattoir as the devices remain in or on the carcasses. Tagging of bovine livestock especially cattle has become important in the control of diseases such as bovine spongiform encephalitis (BSE) and foot and mouth disease. This has become especially relevant for all edible meat throughout world markets, and is now essential where detection of European sourced carcasses is crucial.

Currently, the devices are detected by a transmitting/receiving or a transceiver antenna which can be in the form of a hand operated wand or a fixed antenna which is positioned at an appropriate distance from the carcasses moving past the antenna on a suspended conveyor track. In the case of hand held antennas, this is labour intensive, time consuming with expensive attendant costs, due to increasing numbers of mixed carcasses both with and without devices. This process requires an operator to wave the hand held wand to detect the transponder in or on every carcass. There is a need to read animals of all sizes with either a pellet or ear tag. There is a need to read the devices automatically as 3000 a day may be slaughtered, but only 500 may carry tags and it is essential that the 500 be read. In the case of the fixed antenna, this is a more economical solution as it dispenses with the necessity of having an operator to read every carcass whether it has a device or not although there are other problems with this system. Most abattoirs have some machinery with variable speed drives operating at a frequency in the vicinity of 134 kHz or thereabout. This complies with the ISO standard frequency for which livestock operators must comply with worldwide. As a consequence of the 134 kHz approximate operational frequency, the read range of the transponders by free standing fixed antennae due to interference has been effectively reduced to a third for example, from 1.8 meters to 600 mm. This has resulted in the problem that some readings are missed from transponders on carcasses, which pass the fixed antenna outside the effective read range. One solution to this problem of obtaining a positive reading of the transponder is to have the carcass come into contact and actually brush the antenna. However, having the antenna in a fixed position in the path of a carcass causes too much sideways movement as the carcass brushes the antenna resulting in some carcasses actually falling off the conveyer system causing an increase in down time and possible bruising of the carcasses from swinging and hitting surrounding objects.

OBJECT OF THE INVENTION

It is therefore an object of the present invention to provide an antenna system which seeks to overcome some of the problems of the prior art or to at least provide the public with a useful choice.

STATEMENT OF THE INVENTION

According to one aspect, the invention resides in an antenna system for use in processing of livestock carcasses including in combination, antenna means adapted to transmit and receive signals from transponders in or on carcasses moving on a conveyer system, support means adapted to support the antenna, pivoting means adapted to enable the antenna to pivot on the support means as each carcass comes into contact with the antenna, wherein in operation, the pivoting action enables a wiping contact to be maintained between the antenna and a carcass sufficient to obtain a positive reading of the transponder irrespective of a rotational and/or angular displacement of the carcass about a vertical axis without causing dislodgement of the carcass from the conveyer system or bruising of the carcass.

Preferably the antenna means is an antenna member of a panel configuration with a rectangular or other suitable shape adapted to provide for minimal interference with carcasses coming into contact with the antenna.

Preferably the support means is a vertical post member fixed to the floor and/or the ceiling of an abattoir. In the alterative, the support means can be bracket members specially adapted to be attached to a wall or part of machinery of an abattoir.

Preferably the antenna pivots about a vertical axis, however, depending on the application may also pivot about a horizontal axis or about an axis at an angle therebetween.

Preferably the pivoting means is hinged means adapted to enable the antenna to pivot about a vertical axis.

Preferably the support means and/or the pivoting means have position adjusting means adapted to enable adjustment of the position of the antenna with respect to the path travelled by the carcasses conveyed on the conveyer system.

The ability to vary the position of the antenna is desirable to accommodate carcasses of variable sizes and to allow for the antenna to be mounted at different heights required for the transponder to be positively read. This is a result of the fact that distances from the floor to kill chain heights varies considerably from abattoir to abattoir.

Preferably the pivoting means allows the pivoting of the antenna in an arc between a first position where the antenna is not in contact with a carcass and a second position where the antenna is in contact with a carcass.

Preferably the arc through which the antenna pivots is adjustable by adjusting opposed stop members subtending the desired arc.

Preferably the antenna is biased by biasing means to return to the first position from the second position after completing contact with each carcass.

Preferably the biasing means is return spring means.

Preferably the pivoting action of the antenna between the first and the second positions is controlled by mechanical or hydraulic or pneumatic means or a combination of the same.

More preferably, control of the pivoting action is achieved by use of pneumatic rams and release valves or a combination spring and hydraulic operating mechanism but is not limited to any of these.

BRIEF DESCRIPTION OF THE DRAWINGS

In order that the present invention be more readily understood and put into practical effect, reference will now be made to the accompanying illustrations wherein.

DETAILED DESCRIPTION OF THE DRAWINGS

Example 1

Figure 1:
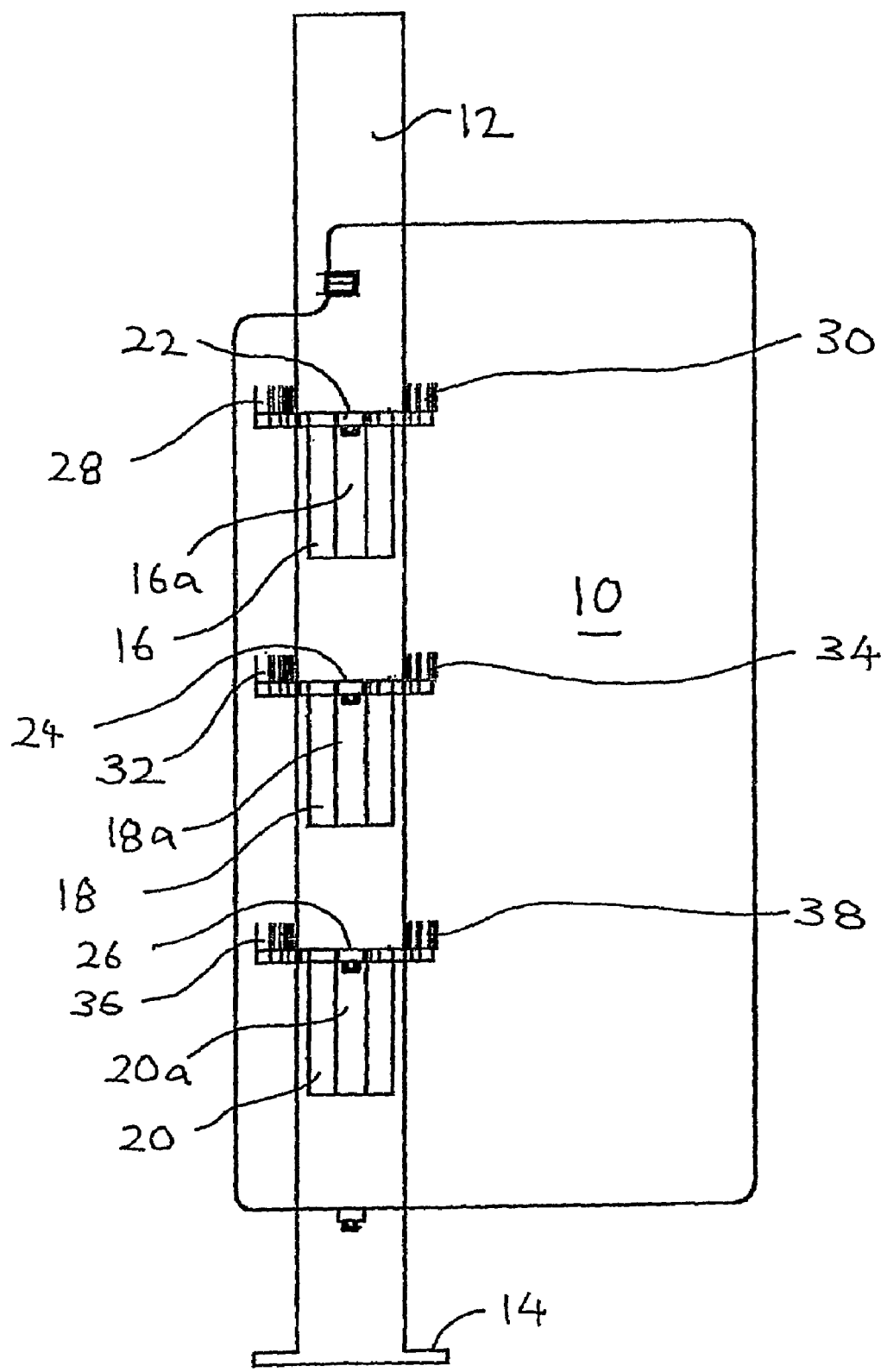
FIG. 1 is a plan view of a preferred embodiment of the invention according to Example 1.
Figure 2:
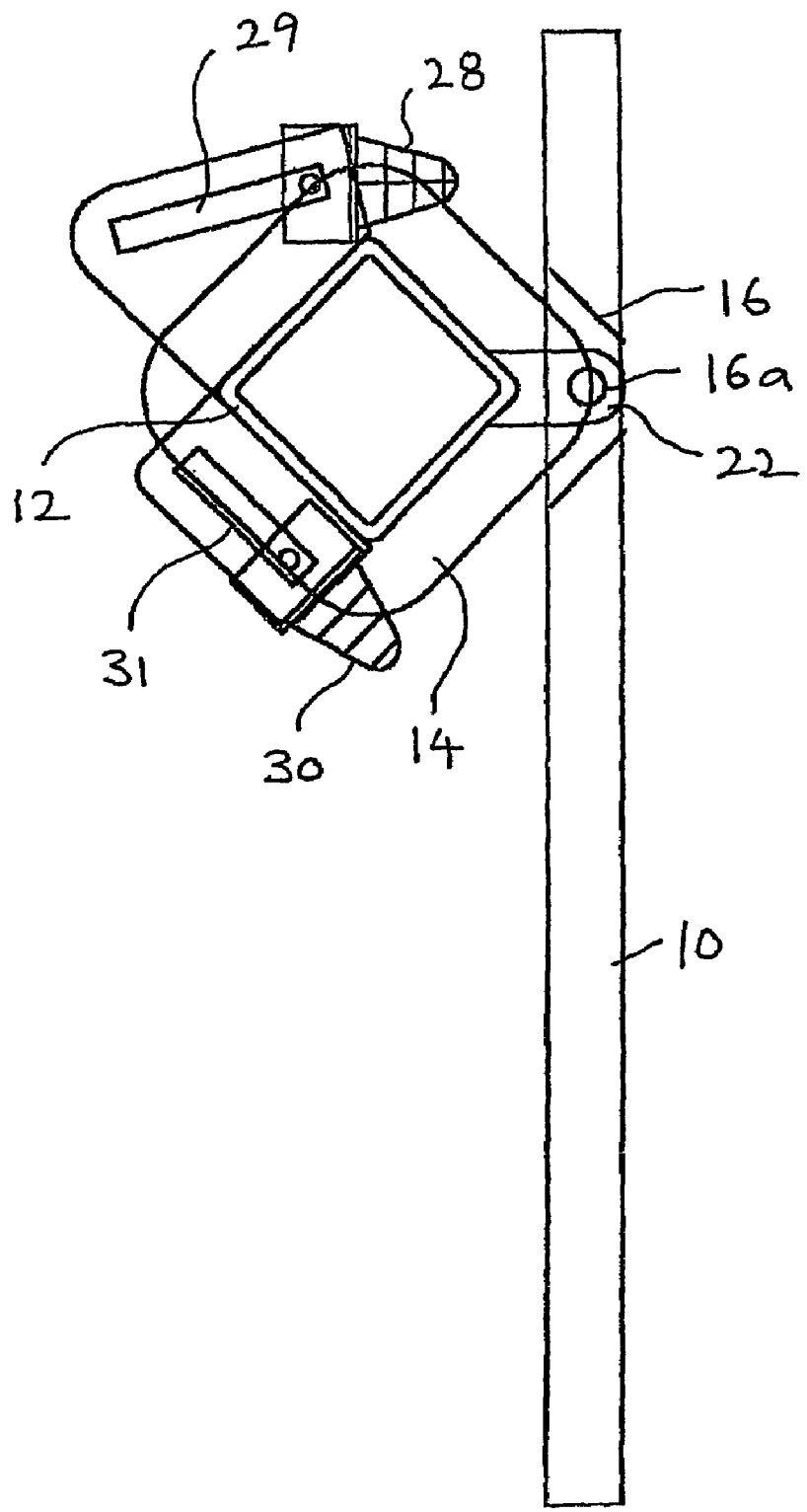
FIG. 2 is a side view of the invention of Example 1.

Referring now to FIGS. 1 and 2, there is shown a preferred antenna system for use with livestock carcass processing according to Example 1.

The antenna 10 is preferably of rectangular panel configuration although it can be other shapes for example having a round or elliptical shape designed for different types of livestock carcasses being processed to provide for minimal interference when in contact with the carcasses. The support means is preferably a vertical post member 12 affixed by a plate 14 or other means to the floor of an abattoir. In this case, a box section steel or composite material post is shown as the preferred support member. It is possible where heavy contact loads are anticipated that the support member or post can also be fixed to the ceiling of the abattoir. Less preferably, the support means can comprise heavy duty steel or composite material brackets (not shown) which are fixed to a wall of the abattoir or to another part of the machinery in the processing line. The panel antenna is designed to pivot about a vertical axis on contact with the carcasses by pivoting means comprising heavy duty hinge members with large gauge pins 16a, 18a, 20a and robust lugs 22, 24, 26 attached to the antenna rotatable about the pins. It is anticipated that forces experienced by the antenna in contact with the carcasses are in the order of up to 1500 kg. The pivoting movement of the antenna by design is to maintain wiping contact with the carcass so that any resulting rotational or angular displacement of the carcass about a vertical axis will not result in a dislodgement of the carcass off the conveyor system. The pivoting motion of the antenna also ensures that a positive reading of a transponder can be obtained irrespective of the position or attitude of the carcass and thus the transponder with respect to the antenna. The movement of the panel antenna as it swings in and out of the path of the carcasses must be controlled by a controlled biasing means so that the antenna moves immediately but slowly back into its original position after a carcass has brushed against it to prevent bruising of the carcasses. The controlled movement is preferably activated by tither spring devices or a mechanical device or a hydraulic spring combination housed in an enclosure. This controlled back and forth movement can also be achieved using hydraulic or pneumatic rams and valves or equivalent mechanisms. The controlled biasing means is indicated generally by reference numeral 100. Shown also are rubber stop members 28, 30, 32, 34, 36, 38 at the end of the rams 29, 31 which control the arc through which the panel antenna swings between the first non-contact position and a second contact position when the antenna is brushed against by a carcass. The position of the rubber stop members can also be adjusted to subtend different angles depending on the application. Preferably but not shown there are also adjustment means to adjust the position of the support member and hence the position of the antenna with respect to the processing line (not shown) in order to accommodate the movement of the antenna so that the starting position of the antenna can be from the non-contact position which is at an angle to the actual kill chain line and to enable the antenna to move to a different angle to the actual kill chain line after a carcass has brushed past the antenna. Preferably there are other adjustment means for adjusting the position of the antenna to accommodate different heights required for the transponders to be read as the kill chain height to the abattoir varies considerably between abattoirs.

ADVANTAGES

The advantages of the present invention include the fact that all animals will be read whether they have a device or not.

The necessity of an operator with a hand held wand antenna is dispensed with thereby providing for automation of transponder readings in abattoirs.

By having the carcass actually rub the antenna the reduced read distance caused by interference from other machinery operating in the vicinity of 134 kHz allows positive readings of all animals with devices.

The controlled movement of the panel antenna design allows for minimal interference with the carcasses.

The antenna design allows for adjustment to accommodate different sized carcasses and different floor distances to kill chain heights between abattoirs.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims this specification the word "comprise" and variations of that word such as "comprises" and "comprising", are not intended to exclude other additives, components, integers or steps.

The invention claimed is:

1. An antenna system for use in processing of livestock carcasses comprising:

an antenna that transmits and receives signals from transponders in or on carcasses moving on a conveyer system, said antenna being biased towards an initial position in a path of said carcasses;

pivot means that enables the antenna to pivot on a support, so that each carcass comes into contact with the antenna the carcass pushes the antenna out of the path of said carcass as the carcass moves on the conveying system; and means for returning the antenna to said initial position in a controlled manner, after passage of the carcass;

wherein the pivoting and biasing action enables a wiping contact to be maintained between the antenna and the carcass sufficient to obtain a positive reading of the transponder as the carcass passes the antenna.

2. An antenna system as claimed in claim 1, wherein the antenna means is an antenna member of a panel configuration with a rectangular or other suitable shape adapted to provide for minimal interference with carcasses coming into contact with the antenna.

3. An antenna system as claimed in claim 1, wherein the support means are bracket members specially adapted to be attached to a wall or part of machinery of an abattoir.

4. An antenna system as claimed in claim 1, wherein the antenna pivots about an axis which is vertical or horizontal.

5. An antenna system as claimed in claim 1, wherein the support means and/or the pivoting means have position adjusting means adapted to enable adjustment of the position of the antenna with respect to the path traveled by the carcasses conveyed on the conveyer system.

6. An antenna system as claimed in claim 1, wherein the pivoting means allows the pivoting of the antenna in an arc between the initial position where the antenna is in the path of the carcass and a second position where the antenna is deflected from the path of the carcass.

7. An antenna system as claimed in claim 6, wherein the arc through which the antenna pivots is adjustable by adjusting opposed stop members subtending the desired arc.

8. An antenna system as claimed in claim 6, wherein the antenna is biased by a controlled biasing means to return to the initial position from the second position after completing contact with each carcass.

9. An antenna system as claimed in claim 6, wherein the pivoting action of the antenna between the initial and second positions is controlled by mechanical or hydraulic or pneumatic means or a combination of the same.

10. An antenna system as claimed in claim 1, wherein control of the pivoting action is achieved by use of pneumatic rams and release valves or a combination spring and hydraulic operating mechanism.

\* \* \* \* \*